US007024558B1

(12) United States Patent
Satake

(10) Patent No.: US 7,024,558 B1
(45) Date of Patent: Apr. 4, 2006

(54) APPARATUS AND METHOD FOR AUTHENTICATING DIGITAL SIGNATURES AND COMPUTER-READABLE RECORDING MEDIUM THEREOF

(75) Inventor: Syuichi Satake, Nei (JP)

(73) Assignee: Fujitsu Limited, Kawasaki (JP)

( * ) Notice: Subject to any disclaimer, the term of this patent is extended or adjusted under 35 U.S.C. 154(b) by 795 days.

(21) Appl. No.: 09/685,859

(22) Filed: Oct. 11, 2000

(30) Foreign Application Priority Data

Nov. 24, 1999 (JP) ................................ 11-332984

(51) Int. Cl.
*G09C 5/00* (2006.01)
*G09K 9/00* (2006.01)
*H04L 9/32* (2006.01)

(52) U.S. Cl. ........................ 713/176; 380/54; 382/100; 705/50

(58) Field of Classification Search .................. 380/54; 382/168, 171, 283, 306; 713/176, 180, 181
See application file for complete search history.

(56) References Cited

U.S. PATENT DOCUMENTS 4,405,829 A * 9/1983 Rivest et al. ................. 380/30
5,005,200 A * 4/1991 Fischer ........................ 380/30
5,018,196 A * 5/1991 Takaragi et al. .............. 380/30
5,668,897 A * 9/1997 Stolfo ........................ 382/283
5,764,770 A * 6/1998 Schipper et al. .............. 380/54
5,825,892 A * 10/1998 Braudaway et al. .......... 380/51
5,875,249 A * 2/1999 Mintzer et al. ............... 380/54
6,298,153 B1 * 10/2001 Oishi ......................... 382/186
6,345,104 B1 * 2/2002 Rhoads ....................... 382/100
6,401,206 B1 * 6/2002 Khan et al. ................. 713/176

FOREIGN PATENT DOCUMENTS

| | | | |
|---|---|---|---|
| EP | 612054 | A | 8/1994 |
| JP | 10-11509 | | 1/1998 |
| JP | 11-30848 | | 2/1999 |
| JP | 11-239129 | | 8/1999 |
| JP | 2000-20718 | | 1/2000 |

* cited by examiner

*Primary Examiner*—Gregory Morse
*Assistant Examiner*—Matthew Heneghan
(74) *Attorney, Agent, or Firm*—Staas & Halsey LLP

(57) ABSTRACT

In an apparatus for authenticating a digital signature, a signature generating part encrypts a digital document by using a private key defined by a signer and digest information for checking whether the digital document has been tampered with, and generates a digital signature. A signature synthesizing part creates image information by synthesizing the digital signature and a predetermined mark. And an image embedding part embeds the image information created by said signature synthesizing part into an indicated position in the digital document.

12 Claims, 10 Drawing Sheets

FIG.10A
FIG.10B
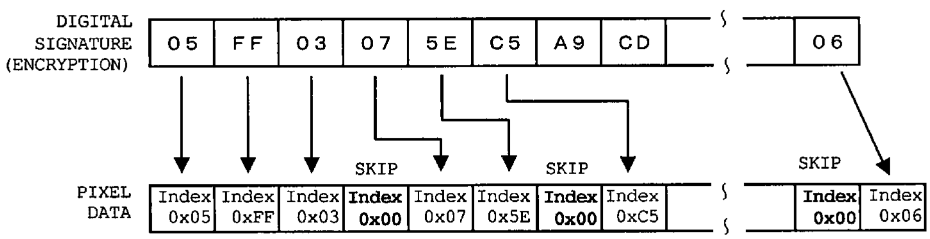
FIG.10C
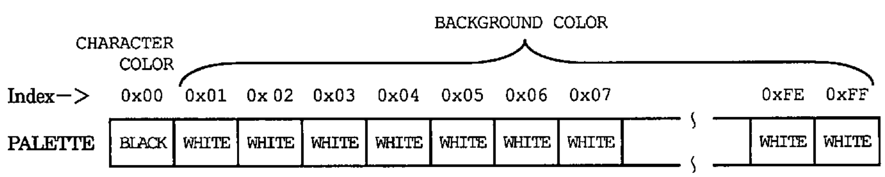

APPARATUS AND METHOD FOR AUTHENTICATING DIGITAL SIGNATURES AND COMPUTER-READABLE RECORDING MEDIUM THEREOF

CROSS REFERENCE TO RELATED APPLICATIONS

The present application is based on Japanese Priority Application No. 11-332984 filed on Nov. 29, 1999, the entire contents of which are hereby incorporated by reference.

BACKGROUND OF THE INVENTION

1. Field of the Invention

The present invention generally relates to apparatuses and methods for authenticating digital signatures and computer-readable recording media having a program recorded therein for causing a computer to authenticate a digital signature, and more particularly to an apparatus and a method for authenticating a digital signature, and a computer-readable recording medium having a program recorded therein for causing a computer to authenticate a digital signature, in which apparatus, method and medium the digital signature is formed by a random unintelligible number or character string and a signature mark of a signer can be built into image information so that the digital signature can be visually recognized.

2. Description of the Related Art

In a network such as a client/server system shown in FIG. 1, a plurality of clients and a server are connected through the network. In such a network system, an electronic decision system is widely known in which a decision transaction is conducted by utilizing GroupWare.

In the electronic decision system, a digital signature is used. For example, in FIG. 1, a user A of a client A attaches a digital signature to a document created by the user A and then sends the document to a user B of a client B through the network. The user B of the client B obtains a public key for decrypting the digital signature of the user A of the client A and decrypts the digital signature attached to the document received from the user A by using the public key. When the digital signature is successfully decrypted, the document is authenticated so as to be sure that the document was sent from the user A and was not tampered with. As described above, it is possible to authenticate a document author (document sender) by using the digital signature. Thus, it is not required for the document author to print out a created electronic document onto a paper sheet and then stamp a personal seal on this paper sheet where the created electronic document was printed.

However, the conventional digital signature described above has disadvantages.

Generally, the digital signature is formed by a random unintelligible number or character string. Thus, the digital signature can not be recognized easily by human eyes while a stamped seal identifying the document author can be easily recognized by human eyes. Accordingly, it is difficult for a receiver which has received the created electronic document from the document author to distinguish a difference between a legal digital signature and an illegal digital signature of the document author. Also, the digital signature formed by an unintelligible number or character string makes the receiver uncomfortable and it is required for the receiver to decrypt the digital signature.

Moreover, the digital signature recently has become 512 to 1024 bits in length. Compared with the seal stamped on the paper sheet, a larger space is required to show the digital signature.

Also, the digital signature conventionally has another disadvantage in that a position of the digital signature is limited to an end of the created document, while there is no limitation on where to stamp a seal on the paper sheet.

SUMMARY OF THE INVENTION

It is a general object of the present invention to provide an apparatus for authenticating a digital signature in which the above-mentioned problems are eliminated.

A more specific object of the present invention is to provide an apparatus and a method for authenticating a digital signature, and a computer-readable recording medium having a program recorded therein for causing a computer to authenticate a digital signature, in which apparatus, method and medium the digital signature is formed by a random unintelligible number or character string and a signature mark of a signer can be built into image information so that the digital signature can be visually recognized.

The above objects of the present invention are achieved by an apparatus for authenticating a digital signature, including: a signature generating part encrypting a digital document by using a private key defined by a signer and digest information for checking whether the digital document has been tampered with, and generating a digital signature; a signature synthesizing part creating image information by synthesizing the digital signature and a predetermined mark; and an image embedding part embedding the image information created by the signature synthesizing part into an indicated position in the digital document.

According to the present invention, the digital signature is created by encrypting the private key for authenticating the signer and the digest key for validating the digital document. Further, the digital signature is built in the image information and then the image information including the digital signature is embedded in the digital document. Therefore, it is possible for a receiver receiving the digital document including the digital signature through the network to visually distinguish that the mark represented by the image information is sent form the signer. In addition, it is possible for the receiver to simultaneously authenticating the signer and validating the digital document.

The above objects of the present invention are achieved by an apparatus for authenticating a digital signature, including: a signature extracting part extracting the digital signature from image information embedded into a digital document; a digest obtaining part decrypting the digital signature by a public key opened by a signer and obtaining first digest information for checking whether the digital document has been tampered with; and an authenticating part determining whether second digest information regenerated based on the digital document identically corresponds to the first digest information obtained by the digest obtaining part and authenticating the digital signature based on a result of the determination.

According to the present invention, the digital signature is authenticated by comparing the first digest information obtained by decryption with the second digest information regenerated from the digital document. Therefore, as a result of comparison, when the first digest information identically corresponds to the second digest information, the signer is authenticated and the digital document is validated at the same time.

Moreover, the above objects of the present invention are achieved by a method for authenticating a digital signature, including the steps of: (a) encrypting a digital document by using a private key defined by a signer and digest information for checking whether the digital document has been tampered with, and generating a digital signature; (b) creating image information by synthesizing the digital signature and a predetermined mark; and (c) embedding the image information created in the step (b) into an indicated position in the digital document.

According to the present invention, it is possible to provide the method for authenticating a digital signature in which method the digital signature, which is generated from a random number or character string, can be imaged to be visually recognizable.

The above objects of the present invention are also achieved by a method for authenticating a digital signature, including the steps of: (a) extracting the digital signature from image information embedded into a digital document; (b) decrypting the digital signature by a public key opened by a signer and obtaining first digest information for checking whether the digital document has been tampered with; and (c) determining whether second digest information regenerated based on the digital document identically corresponds to the first digest information obtained by the step (b) and authenticating the digital signature based on a result of the determination.

According to the present invention, it is possible to provide the method for authenticating a digital signature in which method the signer can be authenticated and the digital document can be validated simultaneously.

Furthermore, the above objects of the present invention are achieved by a computer-readable recording medium having a program recorded therein for causing a computer to authenticate a digital signature, including the codes of: (a) encrypting a digital document by using a private key defined by a signer and digest information for checking whether the digital document has been tampered with, and generating a digital signature; (b) creating image information by synthesizing the digital signature and a predetermined mark; and (c) embedding the image information created in the step (b) into an indicated position in the digital document.

According to the present invention, it can be realized by a computer installing the codes from the computer-readable recording medium that the digital signature, which is generated from a random number or character string, can be imaged to be visually recognize.

The above objects of the present invention are achieved by a computer-readable recording medium having a program recorded therein for causing a computer to authenticate a digital signature, including the codes of: (a) extracting the digital signature from image information embedded into a digital document; (b) decrypting the digital signature by a public key opened by a signer and obtaining first digest information for checking whether the digital document has been tampered with; and (c) determining whether second digest information regenerated based on the digital document identically corresponds to the first digest information obtained by the code (b) and authenticating the digital signature based on a result of the determination.

According to the present invention, it can be realized by a computer installing the codes from the computer-readable recording medium that the signer can be authenticated and the digital document can be validated simultaneously.

BRIEF DESCRIPTION OF THE DRAWINGS

Other objects, features and advantages of the present invention will become more apparent from the following detailed description when read in conjunction with the accompanying drawings, in which:

FIGS. 10A, 10B and 10C are diagrams for explaining a process for decrypting the seal image.

DESCRIPTION OF THE PREFERRED EMBODIMENTS

Figure 1:
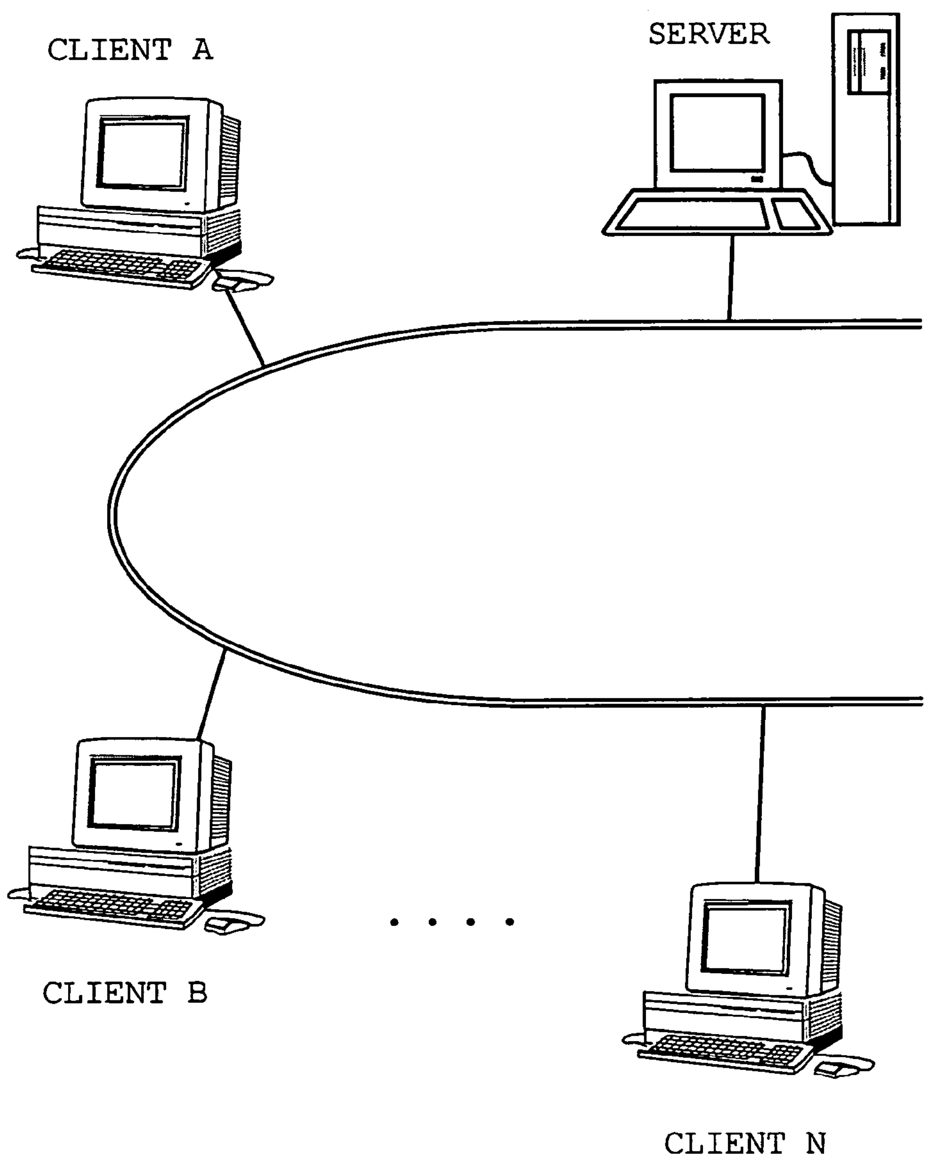
FIG. 1 is a diagram illustrating a client/server system.
Figure 2:
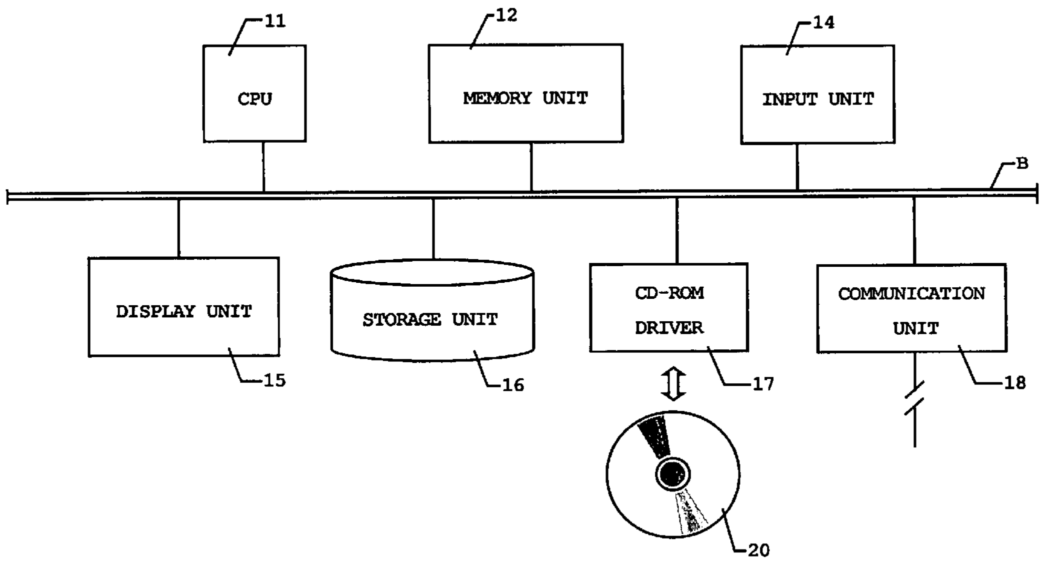
FIG. 2 is a block diagram of a hardware configuration of an apparatus for authenticating a digital signature according to an embodiment of the present invention.

FIG. 2 is a block diagram of a hardware configuration of an apparatus for authenticating a digital signature according to an embodiment of the present invention.

In FIG. 2, the apparatus as a computer system includes a CPU (Central Processing Unit) 11, a memory unit 12, an input unit 14, a display unit 15, a storage unit 16, a CD-ROM driver 17 and a communication unit 18, which are mutually connected by a bus B.

The CPU 11 controls the entire computer system in accordance with a program resident in the memory unit 12. In addition, the CPU 11 executes processes for authenticating a digital signature that will be described later. The memory unit 12 includes ROM and RAM. Also, the memory unit 12 temporarily stores programs and various data necessary for or obtained from executions of the processes. In addition, a part of the memory unit 12 is assigned as a working area accessed by CPU 11.

The input unit 14 includes a keyboard and a mouse but is not limited to only these input devices. The input unit 14 is used for a user to register and change information for an authentication process, and to input information into the computer system. The display unit 15 displays results of various processes or data necessary for the user.

The storage unit 16 includes a hard disk and stores various data and programs.

In accordance with instructions from the CPU 11, the CD-ROM driver 17 reads information from the CD-ROM 20 set in the CD-ROM driver 17 and then provides the information to the storage unit 16. For example, various programs according to the present invention are provided by the CD-ROM 20. That is, the programs read from the CD-ROM 20 are installed in the storage unit 16 through the CD-ROM driver 17. It should be noted that a recording medium is not limited to the CD-ROM 20, but another computer-readable recording medium such as a magnetic disk, a magnetic tape, an optical disk, a magneto-optical disk, a semiconductor memory or the like may be used.

Figure 3:
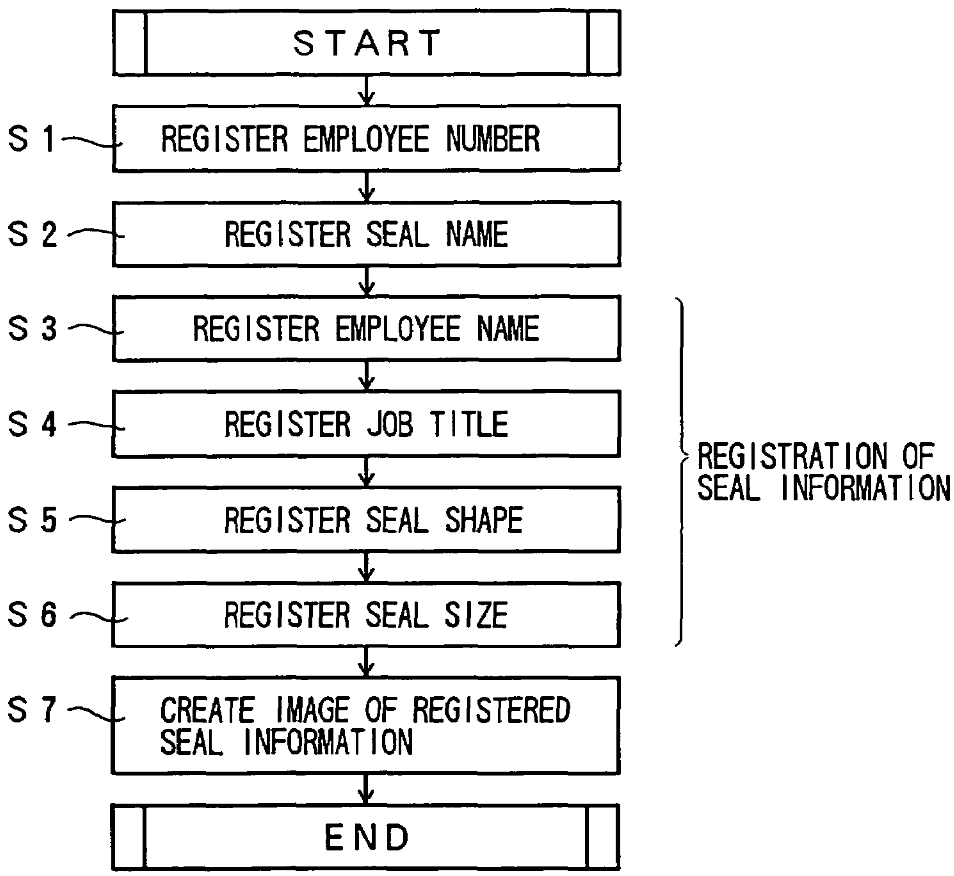
FIG. 3 is a flowchart for explaining a registration process for seal information.
Figure 4A:
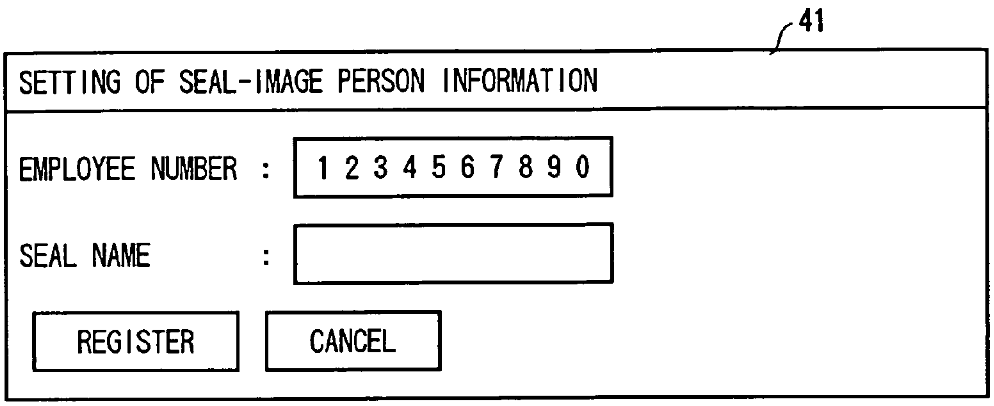
FIG. 4A is a diagram illustrating a setting window for seal-image personal information and FIG. 4B is a diagram illustrating a registration window of a seal image.
Figure 4B:
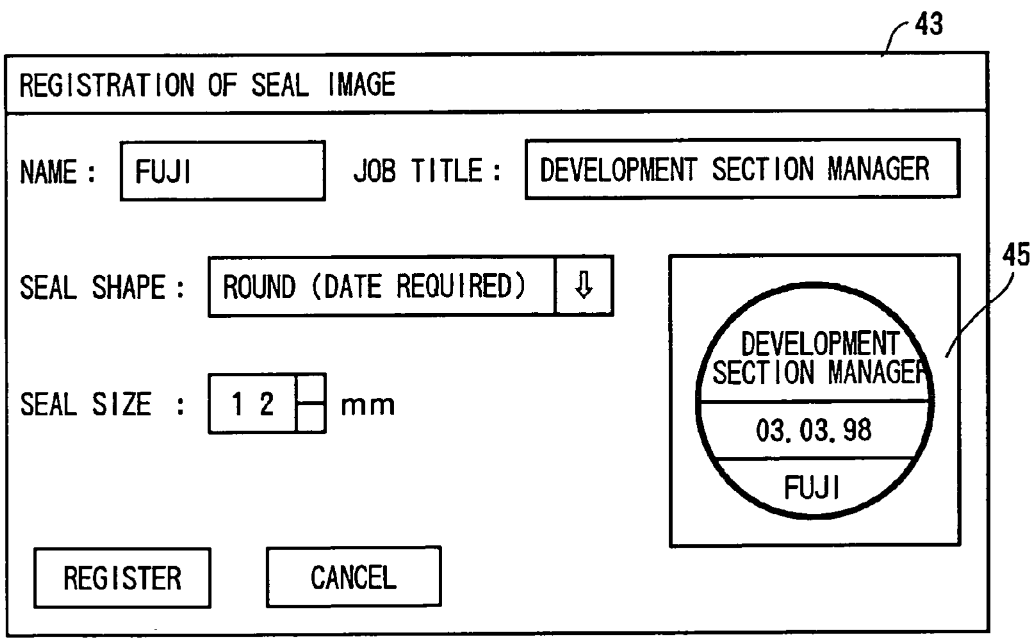

A registration process for seal information will be described with reference to FIG. 3, FIGS. 4A and 4B, according to the embodiment of the present information. FIG. 3 is a flowchart for explaining the registration process for the seal information. FIG. 4A is a diagram illustrating a setting window for seal-image personal information. FIG. 4B is a diagram illustrating a registration window of a seal image.

In FIG. 3, a user A using a client A opens a setting window 41 shown in FIG. 4A at the display unit 15 in FIG. 2 in order to register seal-image personal information including secret information (a password or the like) and open information (a user name, a job title or the like). Then, in order to register necessary information, the user A inputs an employee number (step S1) and subsequently inputs a seal name (for example, "date seal 1", "private seal 1" or the like) (step S2). When the user A clicks "REGISTER", the registration window 43 for a seal image shown in FIG. 4B is displayed. At the registration window 43, the user A inputs a name (step S3) and a job title (step S4). Furthermore, the user A selects one seal shape (step S5) and then indicates a seal size, for example, in millimeters (mm) (step S6). For illustration, the user A registers "FUJI" for the name, "DEVELOPMENT SECTION MANAGER" for the job title, "ROUND (DATE REQUIRED)" for the seal shape, and "12" mm for the seal size. In this case, a seal image is generated based on the above input information and a seal image display area 45 shows the seal image (step S7). The user A registers the seal image by clicking "REGISTER". The above input information and the seal image generated in the step S7 are registered in the storage unit 16 in FIG. 2. When the user A wishes to cancel registering the input information or the seal image, the user A clicks "CANCEL".

The seal image may also be registered in the storage unit 16 after being scanned by a scanner. That is, an electronic signature generated when a signature handwritten by the user A is scanned can be registered in the storage unit 16 as a private seal image. When the seal image is drawing (vector) information, it is not required to scan the seal image.

As described above, the storage unit 16 in FIG. 2 stores the open information (the employee number, the name, the job title or the like for the user A), and the seal name and seal image information including the seal shape and seal size) registered by the user A from the setting window 41 in FIG. 4A and the registration window 43 in FIG. 4B.

The user A creates a document and embeds the registered seal image into the document.

Figure 5:
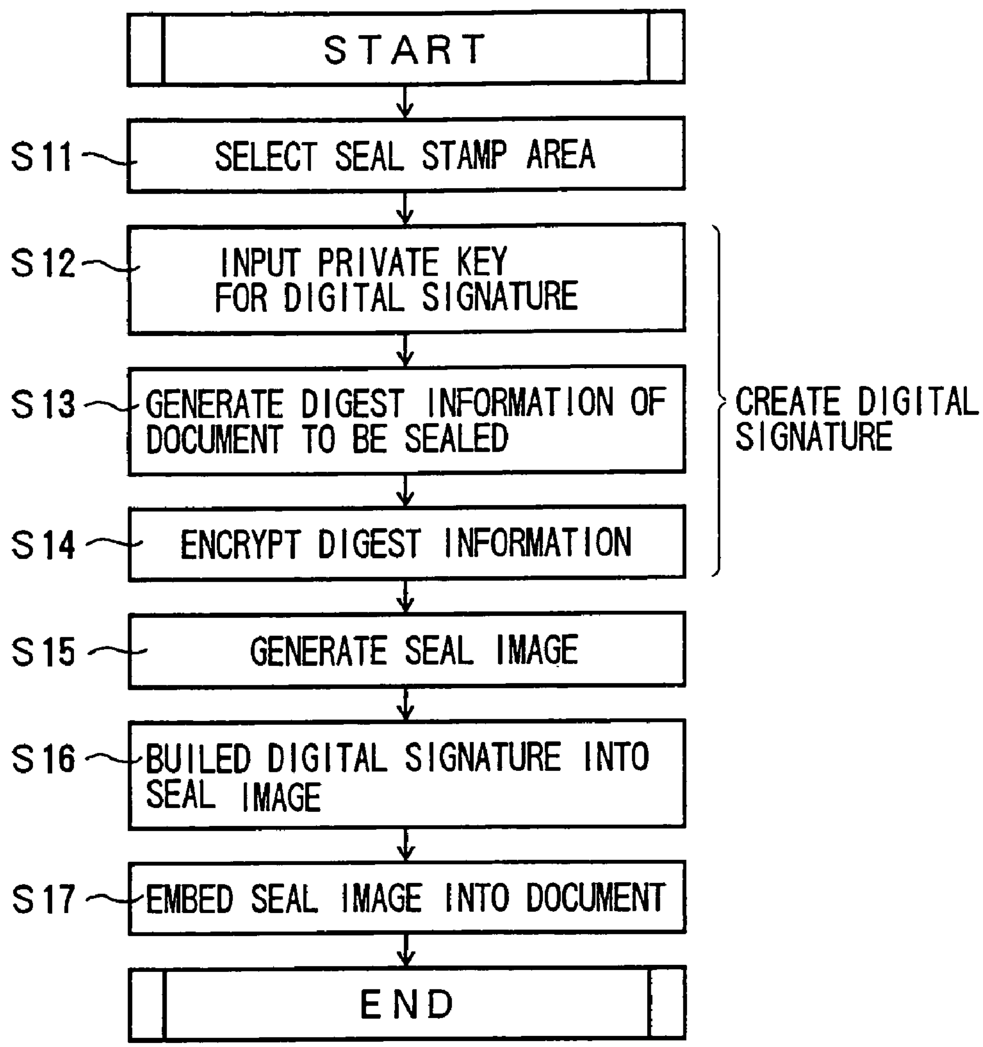
FIG. 5 is a flowchart for explaining a process for embedding the seal image into a document.
Figure 6A:
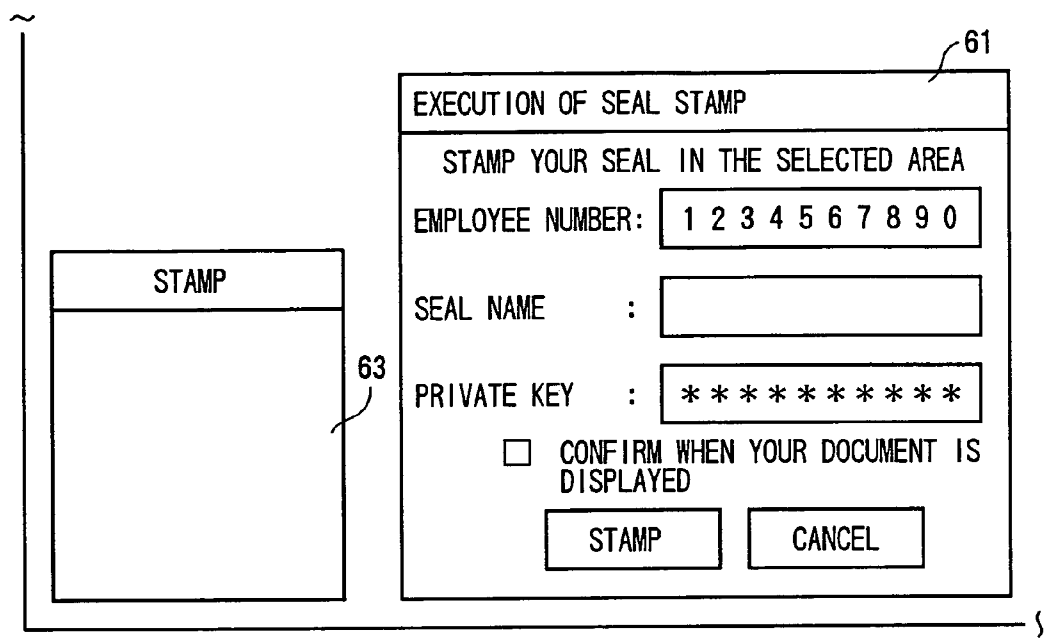
FIG. 6A is a diagram illustrating an execution window for stamping a seal on an opened document and FIG. 6B is a diagram illustrating a confirmation of the stamped seal onto the opened document.
Figure 6B:
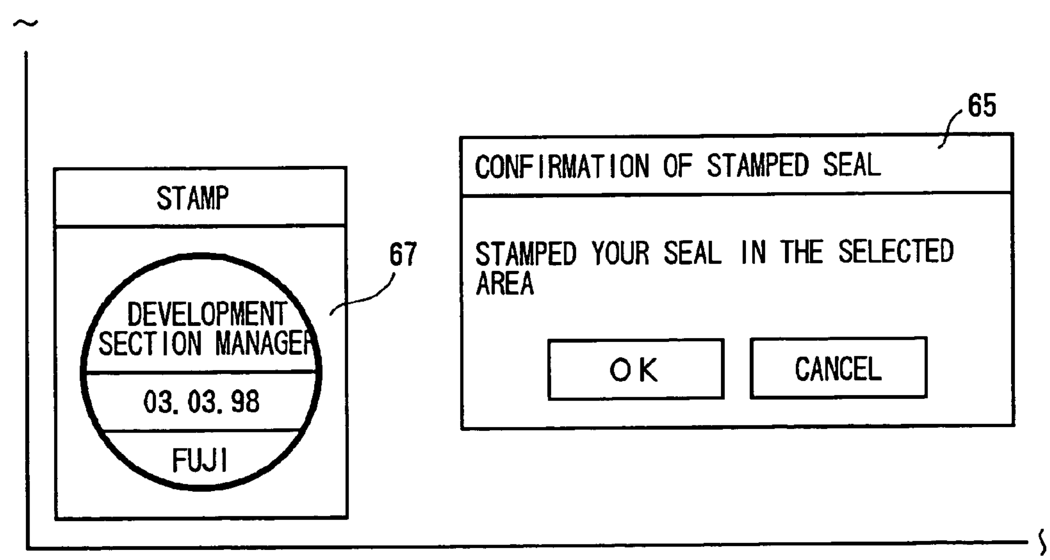

A process for embedding the seal image into the document will now be described with reference to FIG. 5, FIG. 6A and FIG. 6B. FIG. 5 is a flowchart for explaining the process for embedding the seal image into the document. FIG. 6A is a diagram illustrating an execution window for stamping a seal on an opened document and FIG. 6B is a diagram illustrating a confirmation of the stamped seal onto the opened document.

In FIG. 5, the user A opens the execution window 61 in FIG. 6A on the document created by the user A and indicates an area 63 for embedding the seal image registered beforehand (step S11). Subsequently, the user A inputs the employee number, for example "1234567890", the seal name and a private key into respective predetermined input fields, and then clicks "STAMP" on the execution window 61 (step S12). By clicking "STAMP", the CPU 11 in FIG. 2 of the client A used by the user A generates an MD (message digest) file (or digest information) ensuring contents of the document created by the user A (sealed document) (step S13). Subsequently, the CPU 11 encrypts the digest information generated in the step S13 (step S14). Accordingly, the digital signature, which is formed by an unintelligible number or character string, is created by encrypting the digest information in accordance with a predetermined method based on the private key defined by the user A.

The CPU 11 searches the storage unit 16 in FIG. 2 for seal image data registered by the user A based on the employee number and the seal name indicated by the user A on the execution window 61.

The CPU 11 regenerates the seal image from the seal image obtained from the storage unit 16 (step S15). The digital signature created from the digest information is embedded into the seal image regenerated in the step S15 (step S16). In detail, a process for building the digital signature into the seal image will be described later. The seal image the built-in digital signature is embedded into the area 63 of the document, which was indicated by the user A when the execution window 61 was opened. Then the seal image is displayed as an embedded seal image in an embedded area 67 of the document in FIG. 6B and the confirmation window 65 shown in FIG. 6B is displayed on the document (step S17). When the user A clicks "OK", it is confirmed that the seal image is to be embedded into the document. The process is then completed.

Accordingly, the digital signature can be embedded with the seal image into the document such as an HTML (Hyper Text Markup Language), an SGML (Standard Generalized Markup Language), an XML (extensible Markup Language) or the like and can be sent to a client B through the network.

Figure 7:
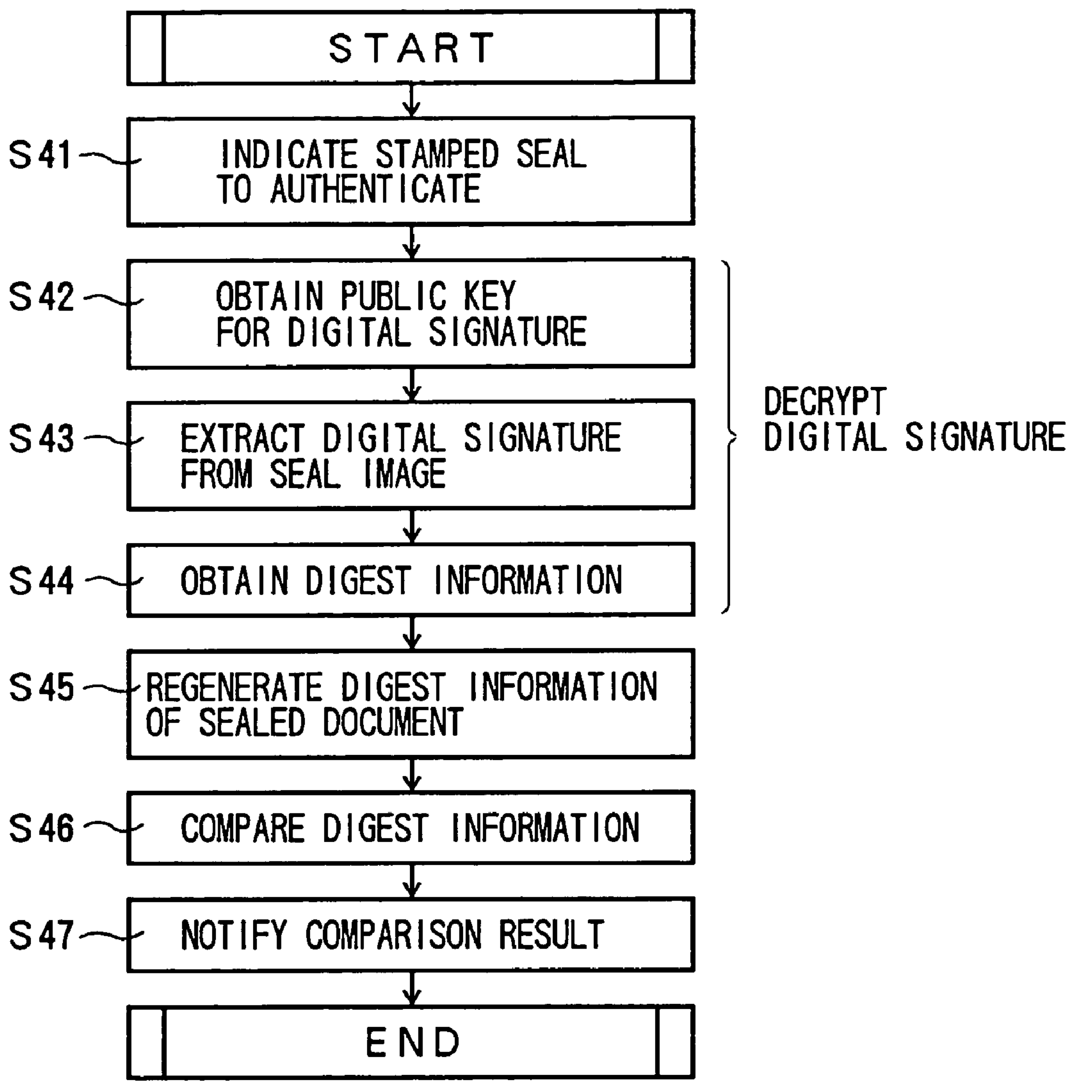
FIG. 7 is a flowchart for explaining processes for authenticating the digital signature.
Figure 8A:
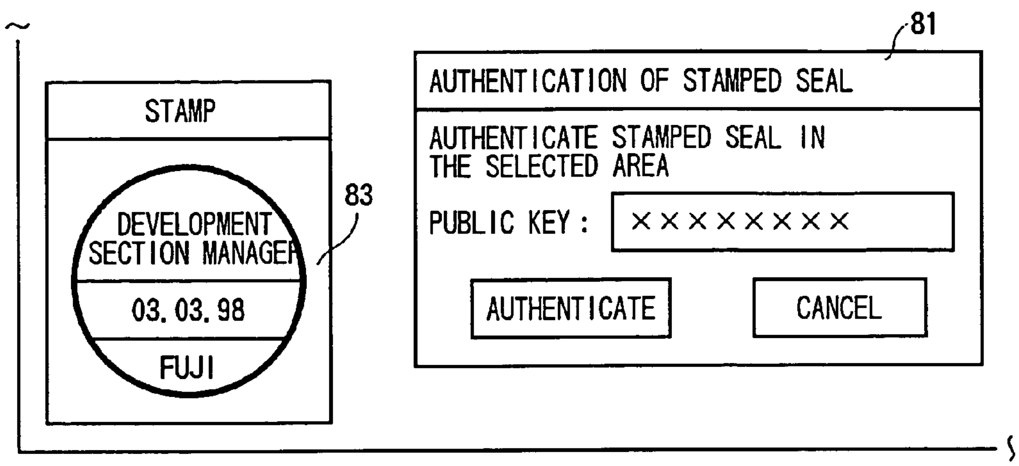
FIG. 8A is a diagram illustrating an authentication window for authenticating a stamped seal image and FIG. 8B is a diagram illustrating an authentication result window when the stamped seal image is successfully authenticated.
Figure 8B:
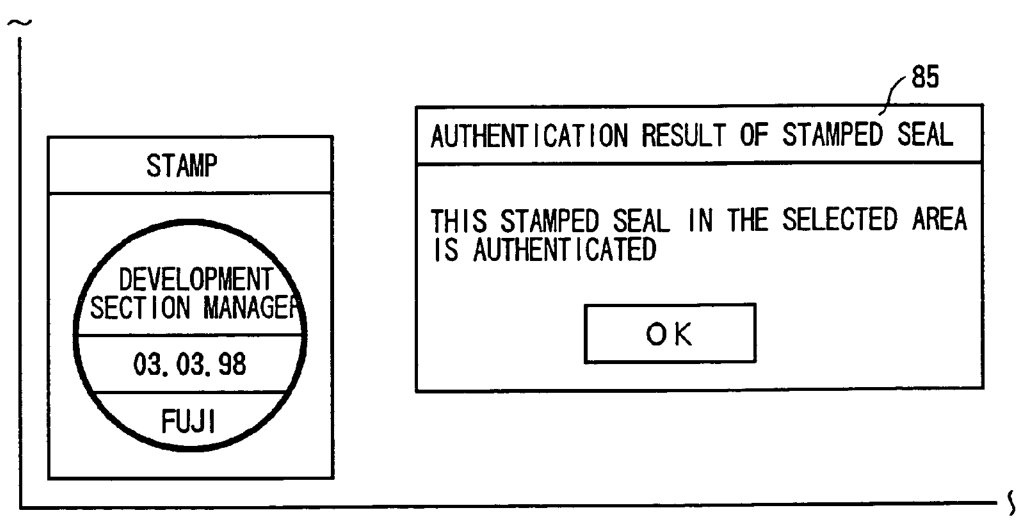
Figure 9:
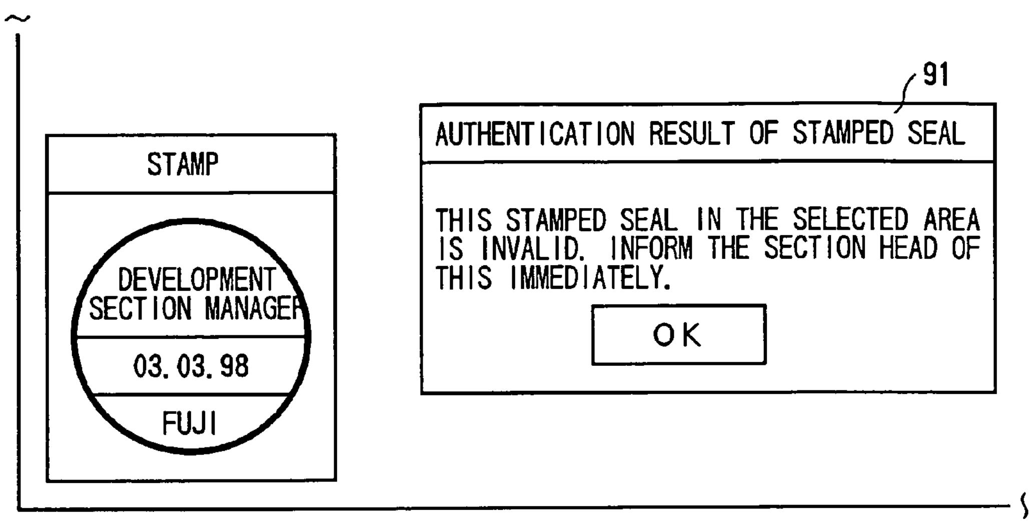
FIG. 9 is a diagram illustrating another authentication result window when the stamped seal image is not authenticated.

A process for authenticating a digital signature will now be described in a case in which a document has embedded therein a seal image with the digital signature built in, with reference to FIG. 7, FIGS. 8A and 8B, and FIG. 9. FIG. 7 is a flowchart for explaining processes for authenticating the digital signature. FIG. 8A is a diagram illustrating an authentication window for authenticating a stamped seal image and FIG. 8B is a diagram illustrating an authentication result window when the stamped seal image is successfully authenticated. And FIG. 9 is a diagram illustrating another authentication result window when the stamped seal image is not authenticated.

It should be noted that the client B as a receiver implements the hardware configuration shown in FIG. 2.

In FIG. 7, a user B at the client B indicates a seal area 83 for authenticating the digital signature on a document received from the client A on the display unit 15 in FIG. 2 and then the authentication window 81 in FIG. 8A is opened (step S41). Subsequently, the user B obtains a public key (step S42). That is, the user B may obtain the public key from a public key list provided by a server on the Internet. In this case, the public key can be searched for by sender name, the employee number of the sender, or other information specifying the sender. The user B inputs the public key obtained in the step S42 into a predetermined input field on the authentication window 81 in FIG. 8A and clicks "AUTHENTICATE".

The CPU 11 of the client B extracts the digital signature from the seal image data of the seal area 83 and obtains the digital signature, that is, the random number or character string (step S43).

The CPU 11 decrypts the digital signature by the public key obtained in the step S42. Since the digital signature was encrypted by digest information and the private key of the user A, the digest information is extracted after the digital signature is decrypted (step S44). Hereinafter, the digest information may be referred to as decrypted digest information.

Furthermore, the CPU 11 regenerates an MD file (regenerated digest information) of the document received from the user A (step S45). Subsequently, the CPU 11 compares the decrypted digest information extracted by decrypting the digital signature in the step S44 with the regenerated digest information regenerated in the step S45 (step S46) and notifies the user B of a comparison result as an authentication result by displaying the authentication result window 85 (step S47). When the regenerated digest information identically corresponds to the decrypted digest information, the authentication result window 85 shown in FIG. 8B is displayed at the display unit 15 in FIG. 2 so as to notify the user B that the seal image stamped on the document received from the user A is valid. That is, the legal digest information is obtained in the step S44 and then the user A as a writer is authenticated and it is verified that the document received from the user A has not been tampered with. On the other hand, when the regenerated digest information does not identically correspond to the decrypted digest information, another authentication result window 91 shown in FIG. 9 is displayed at the display unit 15 so as to notify the user B that the seal image stamped on the document received from the user A is invalid. That is, the user A as a writer is invalid or the document received from the user A has been tampered with, or both the user A and the document are invalid.

The process for building the digital signature into the seal image will be now described in details with reference to FIGS. 10A, 10B and 10C.

Referring to FIG. 5, the CPU 11 of the client A at the sender side obtains the private key input by the user A on the execution window 61 shown in FIG. 6A (step S12). The CPU 11 generates the digital signature shown in FIG. 10A by encrypting the digest information generated in the step S13 by an encryption function. For the sake of convenience, a hex number is used in FIG. 10A.

Subsequently, the CPU 11 obtains the seal image generated in the step S15. The seal image is formed by pixel data (bitmap data) and each pixel data is an index number indicating a palette position. In the embedded area 67 of the document that is confirmed on the confirmation window 65 shown in FIG. 6B, for example, a background color is white and a seal color (character color) is black. In this case, the pixel data of the seal image obtained is formed by a plurality of index numbers indicating white or black. The CPU 11 replaces the index numbers indicating colors other than the character color (white) with data (hex numbers) of the digital signature from a beginning of the pixel data. For example, when the seal image is created, the character color of the seal image is always defined at a beginning of the palette. Since the index number of black is “00 (hex)”, the CPU 11 replaces the index numbers with the data of the digital signature while skipping “00 (hex)” in the data of the digital signature. In a header part (not shown) of the seal image including the pixel data, information indicating data lengths of the seal image and the digital signature is additionally provided.

The CPU 11 may set color data (for example, RGB data) indicating white to palette positions other than a palette position for black since the palette positions for 256 colors are indicated by the index numbers “00 (hex)” through “FF (hex)”. In this case, the CPU 11 sets white color data to palette positions indicated by the index numbers “01 (hex)” through “FF (hex)” other than the palette position for black as the character color indicated by the index number “00 (hex)”. Accordingly, as shown in FIG. 10C, a palette is created such that the character color is black and background color is white. Thus, the digital signature, which is encrypted and becomes an unintelligible long string, can be built into the seal image so that the user B does not have to be bothered by the unintelligible long string. Also, it is not required to transform the seal image so that the user B can easily distinguish the seal image of the user A by sight.

As described above, the document, which has been embedded therein the seal image having the built-in digital signature is sent to the user B. A process for decrypting the seal image received from the user A will now be described with reference to FIG. 10A and FIG. 10B.

Referring to FIG. 7, in the client B as a receiver, the seal image is extracted by indicating the seal area 83 in FIG. 8A on the document received from the user A (the step S41). The pixel data (bitmap data) forming the seal image is shown in FIG. 10B. The CPU 11 of the client B obtains the information including the data lengths of the seal image and the digital signature from the header of the seal image. In this case, since the character color is indicated by the index number “00 (hex)”, the CPU 11 reads the pixel data from the beginning of the seal image while skipping “00 (hex)” in the pixel data. Then, the CPU 11 extracts the digital signature shown in FIG. 10A (the step S43).

Subsequently, the CPU 11 decrypts the digital signature extracted in the step S43 by using the public key obtained in the step S42 and a function such as a decryption function. Then, the digest information is obtained (the step S44).

In the embodiment, the user B obtains the public key from a server providing the public key list. Alternatively, the client A as a sender may set information including the name and the employee number of the user A in the header of the seal image so that the client B as a receiver can obtain the public key from the server. Thus, it is not required for the user B using the client B to access the server to obtain the public key.

Moreover, in the embodiment, the digital signature is built in the background of the seal image. Alternatively, in FIG. 10C, instead of “black” indicated by the index number “00 (hex)”, “white” can be applied as the character color and instead of “white” indicated by the index numbers “01 (hex)” through “FF (hex)”, “black” can be applied as the background color.

According to the present invention, the digital signature is built into an image so as to be imaged. That is, the imaged digital signature, which is generated from a random number or character string, can be visually recognized easily.

In addition, it is possible to reduce an area for displaying the digital signature formed by an unintelligible string having a length of 512 to 1024 bits.

Furthermore, by a combination of the MD file (digest information) and authentication (password), it is possible to protect the document from being tampered with and to authenticate the writer of the document simultaneously.

In the embodiment, the steps S13 and S14 in FIG. 5 correspond to the signature generating part in claim 1 and the steps S15 and S16 in FIG. 5 correspond to the signature build-in part in claim 1.

Also, the step S43 in FIG. 7 corresponds to the signature extracting part in claim 3 and the step S44 in FIG. 7 corresponds to the digest obtaining part in claim 3.

The present invention is not limited to the specifically disclosed embodiments, variations and modifications, and other variations and modifications may be made without departing from the scope of the present invention.

What is claimed is:

1. An apparatus for authenticating a digital signature, comprising:

a signature generating part encrypting a digital document by using a private key defined by a signer and digest information for checking whether the digital document has been tampered with, and generating a digital signature;

a signature synthesizing part creating image information by synthesizing the digital signature and a predetermined mark, which enables a receiver to visually recognize a mark of the signer, wherein the digital signature is embedded in a predetermined color other than a color used for the mark of the signer in the predetermined mark; and an image embedding part embedding the image information created by said signature synthesizing part into an indicated position in the digital document.

2. The apparatus as claimed in claim 1, wherein said signature synthesizing part comprises an image information generating part generating pixel data for the image information including the digital signature, wherein:

a palette, where first color information is defined for first index information and second color information is defined for other index information, is referred to;

the first index information is defined for pixels used for the predetermined mark; and each of the other index information, which corresponds to each number of a number string forming the digital signature, is defined for each of other pixels.

3. The apparatus as claimed in claim 2, wherein said image information generating part assigns each of the other index information corresponding to each number of the number string to each pixel from a beginning of the number string forming the digital signature while skipping the pixels used for the predetermined mark.

4. An apparatus for authenticating a digital signature, comprising:

a signature extracting part extracting the digital signature from image information embedded into a digital document, said image information capable of showing a predetermined mark, which enables a receiver to visually recognize a mark of a signer of the digital signature, wherein the digital signature is extracted from a predetermined color other than a color used for the mark of the signer in the predetermined mark;

a digest obtaining part decrypting the digital signature by a public key opened by a signer and obtaining first digest information for checking whether the digital document has been tampered with; and an authenticating part determining whether second digest information regenerated based on the digital document identically corresponds to the first digest information obtained by said digest obtaining part and authenticating the digital signature based on a result of the determination.

5. The apparatus as claimed in claim 4, wherein said signature extracting part refers to a palette where first color information is defined for first index information and second color information is defined for other index information, and defines partial pixel data, formed by removing the first index information from pixel data forming the image information, as the digital signature, so as to generate the digital signature.

6. A method for authenticating a digital signature, comprising (a) encrypting a digital document by using a private key defined by a signer and digest information for checking whether the digital document has been tampered with, and generating a digital signature;

(b) creating image information by synthesizing the digital signature and a predetermined mark, which enables a receiver to visually recognize a mark of the signer, wherein the digital signature is embedded in a predetermined color other than a color used for the mark of the signer in the predetermined mark; and (c) embedding the image information created in said step (b) into an indicated position in the digital document.

7. A method for authenticating a digital signature, comprising (a) extracting the digital signature from image information embedded into a digital document, said image information showing a predetermined mark, which enables a receiver to visually recognize a mark of a signer of the digital signature, wherein the digital signature is extracted from a predetermined color other than a color used for the mark of the signer in the predetermined mark;

(b) decrypting the digital signature by a public key opened by a signer and obtaining first digest information for checking whether the digital document has been tampered with; and (c) determining whether second digest information regenerated based on the digital document identically corresponds to the first digest information and authenticating the digital signature based on a result of the determination.

8. A computer-readable recording medium having a program recorded therein for causing a computer to authenticate a digital signature, said program comprising the codes of:

(a) encrypting a digital document by using a private key defined by a signer and digest information for checking whether the digital document has been tampered with, and generating a digital signature;

(b) creating image information by synthesizing the digital signature and a predetermined mark, which enables a receiver to visually recognize a mark of the signer, wherein the digital signature is embedded in a predetermined color other than a color used for the mark of the signer in the predetermined mark; and (c) embedding the image information into an indicated position in the digital document.

9. The computer-readable recording medium as claimed in claim 8, wherein said code (b) includes a code of (d) generating pixel data for the image information including the digital signature, wherein:

a palette, where first color information is defined for first index information and second color information is defined for other index information, is referred to;

the first index information is defined for pixels used for the predetermined mark; and each of the other index information, which corresponds to each number of a number string forming the digital signature, is defined for each of other pixels.

10. The computer-readable recording medium as claimed in claim 9, wherein said code (d) assigns each of the other index information corresponding to each number of the number string to each pixel from a beginning of the number string forming the digital signature while skipping the pixels used for the predetermined mark.

11. A computer-readable recording medium having a program recorded therein for causing a computer to authenticate a digital signature, said program comprising the codes of:

(a) extracting the digital signature from image information embedded into a digital document, said image information showing a predetermined mark, which enables a receiver to visually recognize a mark of a signer of the digital signature, wherein the digital signature is extracted from a predetermined color other than a color used for the mark of the signer in the predetermined mark;

(b) decrypting the digital signature by a public key opened by a signer and obtaining first digest information for checking whether the digital document has been tampered with; and (c) determining whether second digest information regenerated based on the digital document identically corresponds to the first digest information and authenticating the digital signature based on a result of the determination.

12. The computer-readable recording medium as claimed in claim 11, wherein said signature extracting part refers to a palette where first color information is defined for first index information and second color information is defined for other index information, and defines partial pixel data, formed by removing the first index information from pixel data forming the image information, as the digital signature, so as to generate the digital signature.

* * * * *

UNITED STATES PATENT AND TRADEMARK OFFICE

CERTIFICATE OF CORRECTION

PATENT NO. : 7,024,558 B1
APPLICATION NO. : 09/685859
DATED : April 4, 2006
INVENTOR(S) : Syuichi Satake It is certified that error appears in the above-identified patent and that said Letters Patent is hereby corrected as shown below:

Column 10, lines 4-5, after “comprising” insert --:--

Column 10, lines 18-19, after “comprising” insert --:--

Signed and Sealed this

Twenty-fourth Day of October, 2006

JON W. DUDAS
*Director of the United States Patent and Trademark Office*